United States Patent [19]
Leduc

[11] Patent Number: 5,356,067
[45] Date of Patent: Oct. 18, 1994

[54] INTERNAL LINE UP CLAMP

[75] Inventor: Trung Leduc, Houston, Tex.

[73] Assignee: CRC-Evans Pipeline International, Inc., Houston, Tex.

[21] Appl. No.: 72,928

[22] Filed: Jun. 7, 1993

[51] Int. Cl.⁵ .......................................... B23K 37/053
[52] U.S. Cl. ...................... 228/44.5; 228/49.3; 228/50; 228/212; 228/216
[58] Field of Search .............. 228/49.3, 50, 44.5, 228/212, 213, 216, 168; 29/252; 269/27

[56] References Cited

U.S. PATENT DOCUMENTS

| | | | |
|---|---|---|---|
| 3,197,195 | 7/1965 | Work et al. | 269/34 |
| 3,400,872 | 9/1968 | Rogers | 228/44.5 |
| 3,422,519 | 1/1969 | Fehlman | 29/200 |
| 3,425,614 | 2/1969 | Clark | 229/49 |
| 3,458,105 | 7/1969 | Valentine | 228/50 |
| 3,458,106 | 7/1969 | Valentine | 228/44 |
| 3,469,299 | 9/1969 | Rogers | 29/256 |
| 3,512,229 | 5/1970 | Phariss | 24/280 |
| 3,571,908 | 3/1971 | Pilia et al. | 228/212 |
| 3,633,813 | 12/1972 | Looney et al. | 228/41 |
| 3,699,635 | 10/1972 | Bradley et al. | 29/252 |
| 3,741,457 | 6/1973 | Gwin et al. | 228/44.5 |
| 3,750,928 | 8/1973 | Valentine | 228/44.3 |
| 3,765,665 | 10/1973 | Work | 269/27 |
| 3,920,232 | 11/1975 | Clark | 269/25 |
| 3,937,382 | 2/1976 | Cunningham et al. | 228/49.3 |
| 3,979,041 | 9/1976 | Kaneyama et al. | 228/49.3 |
| 4,140,262 | 2/1979 | Wilson et al. | 228/49.3 |
| 4,216,896 | 8/1980 | Chang et al. | 228/216 |
| 4,285,458 | 8/1981 | Slavens | 228/49.3 |
| 4,418,860 | 12/1983 | LaForce | 228/44.5 |
| 4,556,162 | 12/1985 | Gwin et al. | 228/50 |
| 5,090,608 | 2/1992 | Jones | 228/49.3 |

FOREIGN PATENT DOCUMENTS

| | | | |
|---|---|---|---|
| 56-111591 | 9/1981 | Japan | 228/49.3 |
| 889361 | 12/1981 | U.S.S.R. | 228/44.5 |

Primary Examiner—P. Austin Bradley
Assistant Examiner—Jeanne M. Elpel
Attorney, Agent, or Firm—Richards, Medlock & Andrews

[57] ABSTRACT

An improved internal line up clamp (10) is disclosed which has an integral back up ring (12). A first set of pipe clamps (22) move radially outward to engage the inner surface of a first pipe (14). A second set of pipe clamps (62) and a set of back up ring segments (88) are simultaneously moved radially outward into engagement with the inner surface of the pipes. The back up ring segments (88) are spring loaded to exert a relatively constant back up force against the inner surface of the pipes at the weld. In a modification, a fill block (118) can be used to fill the gap between adjacent back up ring segments when engaging the inner surface of the pipe.

11 Claims, 5 Drawing Sheets

INTERNAL LINE UP CLAMP

TECHNICAL FIELD OF THE INVENTION

This invention relates to the welding of pipe, and in particular to a clamp to align the pipe for welding with a back up ring at the weld.

BACKGROUND OF THE INVENTION

A pipeline is constructed of pipe sections or pipe lengths which are welded end to end in the field as the pipeline is constructed. The ends of the pipes to be welded must be clamped in close proximity for welding, a task which is complicated as the pipes are commonly out of round and have high and low sections which resist alignment. It is desirable to true the ends before welding. However, on small pipe with heavy walls, e.g., 24" diameter pipe with 1" wall thickness, it is difficult to generate the force required to round the pipe.

Internal pipe clamps have been developed for clamping the pipes for welding and attempting to true the ends to be welded, such as disclosed in U.S. Pat. No. 3,937,382 to Cunningham et al. issued on Feb. 10, 1976, which have two sets of extendable clamps extendable to clamp to the interior surface of the pipes near the abutting ends of the pipe to be welded. The extendable clamps act to force the pipe into a more circular configuration for welding. However, even after clamping it is common to have pipes of different ovalities and slightly different diameters.

The welding is typically conducted by a welding device exterior the abutting pipes. It is desirable to provide a back up ring on the inside surface of the pipes at the weld. U.S. Pat. No. 3,937,382 discloses a back up ring of this type. Also, U.S. Pat. No. 4,556,162 issued to Gwin et al. on Dec. 3, 1985 discloses a internal pipe clamp with arcuate back up ring segments mounted on certain of the clamping members.

However, a need still exists for a more effective pipe clamp with a back up ring. The clamp should be capable of accommodating the mismatch between pipe ends and be capable of rapid deployment and capable of providing effective clamping.

SUMMARY OF THE INVENTION

In accordance with one aspect of the present invention, an internal line up clamp and back up ring is provided for clamping first and second pipes into proper orientation for welding and to provide a back up ring at the weld. The internal line up clamp includes a frame and a first set of pipe clamps mounted on the frame for movement between a retracted position and a clamping position clamped against the interior surface of the first pipe. Structure is provided for moving the first set of pipe clamps to the clamping position. A second set of pipe clamps is mounted on the frame for movement between a retracted position and a clamping position clamped against the interior surface of the second pipe. A back up ring is mounted on the frame which comprises a plurality of back up ring segments spaced from the second set of pipe clamps. Each back up ring segment is mounted for movement between a retracted position and a back up position urged against the interior surface of the first and second pipes. Structure is provided for simultaneously moving the second set of pipe clamps and the back up ring segments into engagement with the pipe.

In accordance with another aspect of the present invention, the means for moving the second set of pipe clamps and back up ring segments is a double acting air cylinder.

In accordance with another aspect of the present invention, each back up ring segment includes a back up ring shoe, a back up ring base and a spring interconnecting the back up ring shoe and back up ring base, the back up ring shoe contacts the interior surface of the pipes.

In accordance with another aspect of the present invention, each back up ring segment extends only about one inch along the circumference of the interior surface of the pipes.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION

Figure 1:
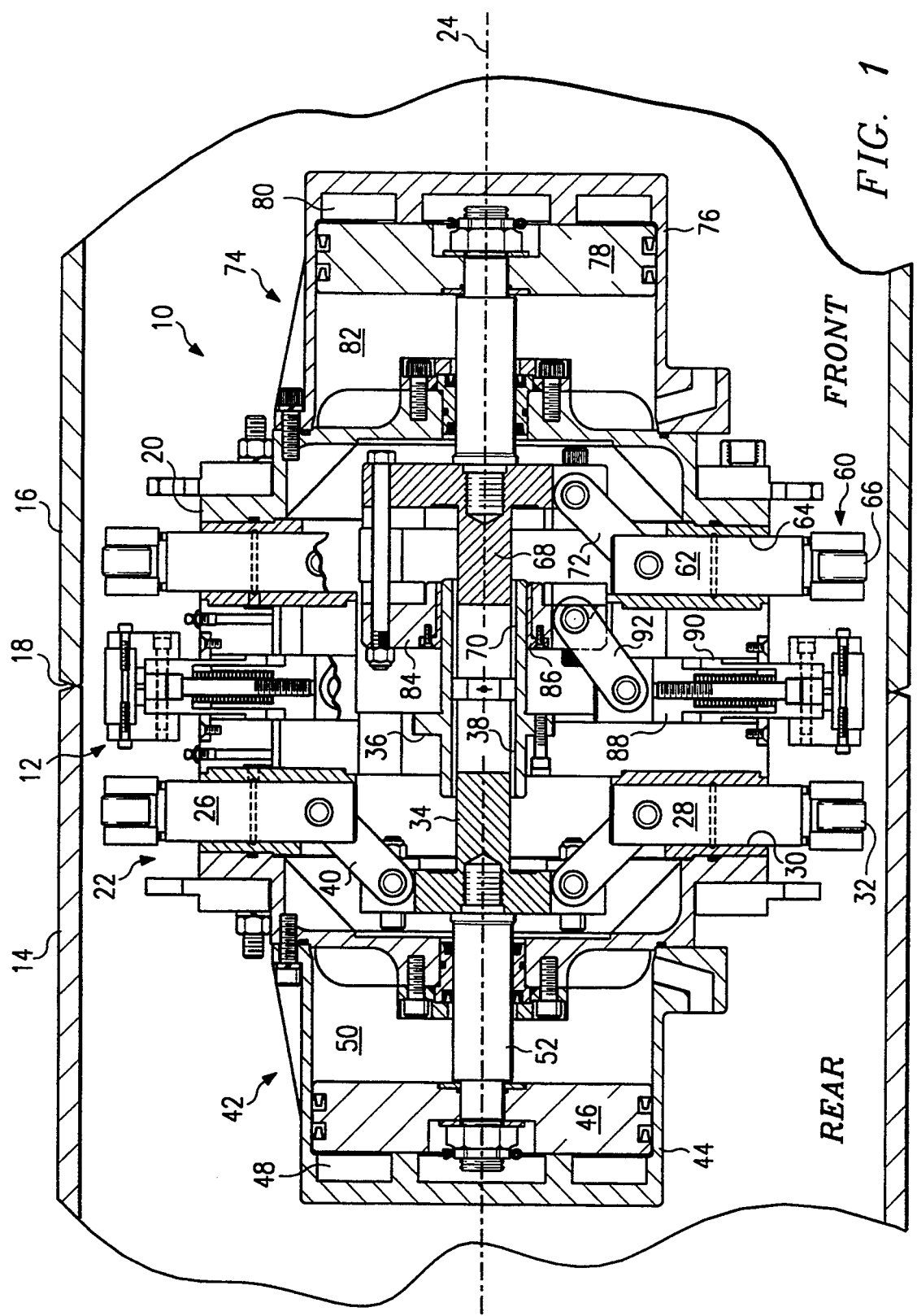
FIG. 1 is a cross sectional view of an internal pipe clamp forming a first embodiment of the present invention.
Figure 2:
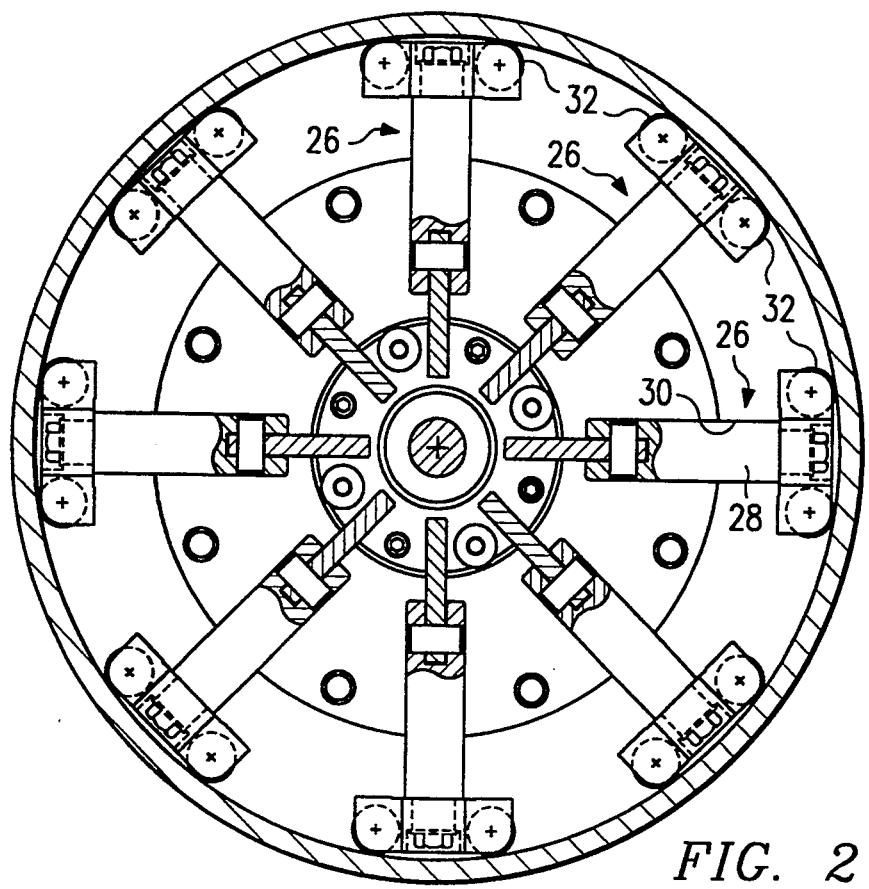
FIG. 2 is a cross sectional view showing a set of pipe clamps in the internal pipe clamp.

With reference now to the accompanying drawings, and in particular to FIG. 1, an internal pipe clamp 10 is illustrated which has an integral back up ring 12. The clamp is used to position adjacent ends of pipe 14 and pipe 16 for welding along the weld groove 18 formed between the abutting ends of the pipe.

The clamp includes a frame 20 which supports a first set of pipe clamps 22 for motion along radial directions from the center line 24 of the frame. Any number of pipe clamps may be utilized, however, eight are illustrated. Each of the individual pipe clamps 26 has a cylindrical body 28 which is slidable within and guided by a cylindrical aperture 30. The radially outermost end of the pipe clamps 26 mounted a pair of wheels 32 mounted to the bodies for rotational motion about axes parallel the center line 24. These wheels 32 permit the point of engagement between the interior surface of the pipe 14 to move relative to the pipe clamps as the pipe clamps attempt to deform the end of the pipe into a circular configuration.

A first ring 34 is mounted in the frame and guided for motion along the center line 24 by a guide portion 36 having an annular sleeve 38° Individual pipe clamp links 40 are hinged at one end to the first ring 34 and at the other end to a pipe clamp 26.

A double acting first air cylinder assembly 42 is mounted on the frame for moving the first ring 34 along the center line 24 and thus moving the pipe clamps 26 axially into and out of engagement with the interior surface of the pipe 14. The assembly 42 includes a cylinder 44 which is bolted to the frame. A piston 46 is positioned within the cylinder 44 and defines a first air chamber 48 and a second air chamber 50. A piston rod 52 is mounted on the piston 46 and is in engagement with the first ring 34. When pressurized air is entered into the first air chamber 48 and air vented from second chamber 50, the piston 46 moves to the right as seen in FIG. 1, causing the first ring 34 to move to the right as shown in FIG. 1 and the pipe clamps 26 to move radially outward into engagement with the inner surface of the pipe 14. Similarly, when pressurized air is entered into the second air chamber 50 and air vented from first air chamber 48, the piston 46 will move to the left, as seen in FIG. 1, moving the first ring 34 to the left and retracting the pipe clamps 26 radially inward toward the center line 24 to release the pipe 14.

A second set of pipe clamps 60 is utilized to clamp the pipe 16 at its end. The second set of pipe clamps include a plurality of individual pipe clamps 62, preferably eight, which slide within and are guided by cylindrical apertures 64 in the frame. Each pipe clamp also mounts a pair of wheels 66 for engaging the inner surface of the pipe 16.

A second ring 68 is slidable relative the frame along the center line 24. The second ring 68 is guided within guide portion 36 by an annular sleeve 70. Pipe clamp links 72 are pivoted at their ends to the second ring 68 and the pipe clamps 62. A double acting second air cylinder assembly 74 is mounted on the frame which defines a cylinder 76. A piston 78 is slidably sealed to the inner wall of the cylinder and defines a first air chamber 80 and a second air chamber 82.

A third ring 84 is bolted to the second ring 68 for sliding motion therewith. The third ring 84 mounts an annular sleeve 86 which slides on the exterior of the guide portion 36.

A number of individual back up shoe clamps 88 have cylindrical bodies and are slidable in the frame for radial motion toward and away from the center line 24. The back up shoe clamps 88 slide within and are guided by the frame for radial motion toward and away from the cylinder center line 24. Back up shoe clamp links 92 are pivoted at one end to the third ring 84 and at the other end to each of the back up shoe clamps 88. Thus, when pressurized air is entered into the first air chamber 80, the piston 78 will move both the second ring 68 and third ring 84 to drive the pipe clamps 62 and back up shoe clamps 88 into engagement with the interior surface of the pipes.

Figure 3:
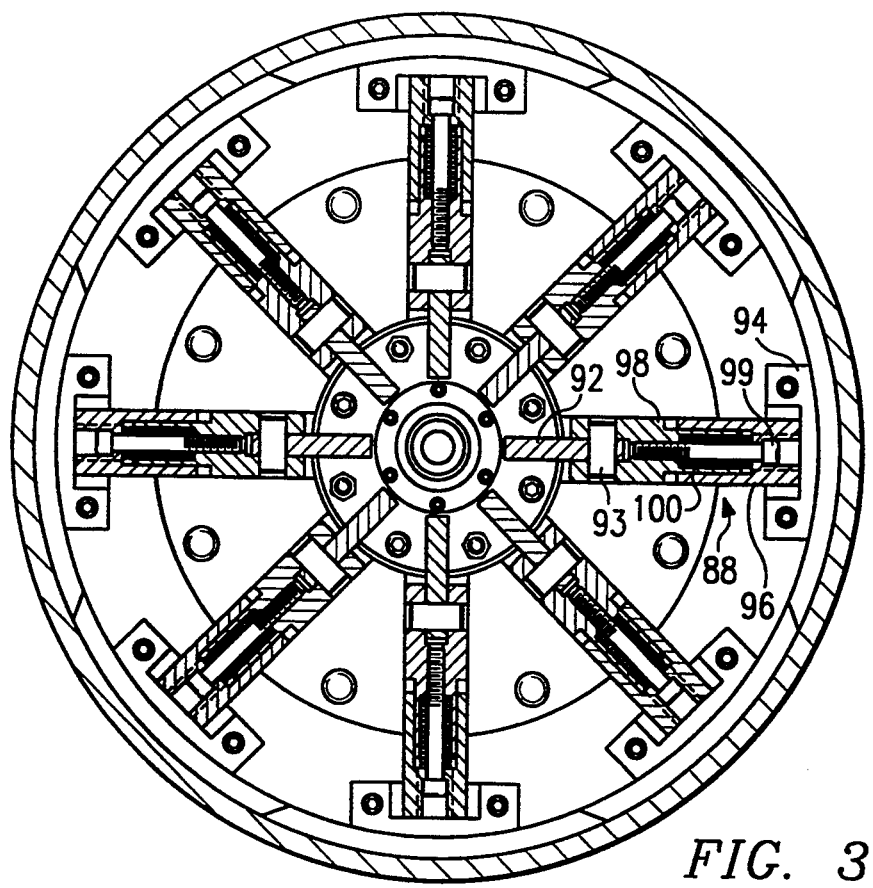
FIG. 3 is a cross sectional view of the back up ring in the internal pipe clamp.

With reference to FIG. 3, the back up shoe clamps 88 can be seen to include a back up shoe 94 bolted to rod 96. Rod 96, in turn, is received on a base 98 and held thereon by a threaded cap screw 99 threaded into base 98. The shoe clamp link 92 is pivotally connected to the base 98 by pin 93. A spring 100 is interposed between the base 98 and the rod 96 to urge the rod and back up shoe 94 either against the head of cap screw 99 or into engagement with the interior surface of the pipes, whichever is closer to the center line 24. The cap screws are adjusted so that the back up shoe 94 would extend about ¼" radially outward from the inner radius of the pipe if the pipe was not present when moved into the engagement position. This provides about ¼" of compression to the spring 100 when the back up shoe 94 is moved into contact with the pipe to preload the back up shoes against the pipe. The cap screws also allow the segment to be adjusted to compensate for a warped pipe end, a variation in pipe end thickness, and high and low sections on the pipe. For example, if the inner surface of a pipe adjacent one clamp is ¼" radially inward from the remainder of the inner surface, the cap screw on that clamp can be screwed in ¼" so that each of the clamps move into contact with the pipe surface more or less simultaneously, and with about equal force. The adjustment also insures the back up shoes 94 will be retracted far enough away from the inner surface of the pipes to allow the pipes to be moved over the pipe clamp 10 without interference.

The springs 100 insure a uniform pressure between the back up shoes 94 and the interior of the pipe when the pipe clamps 62 are in engagement with the interior of the pipe 16. As the pipe clamps 62 are withdrawn radially toward the center line 24 away from the inner surface of the pipe 16, the back up shoes 94 are also simultaneously moved radially toward the center line 24 away from the inner surface of the pipes 14 and 16.

Figure 4:
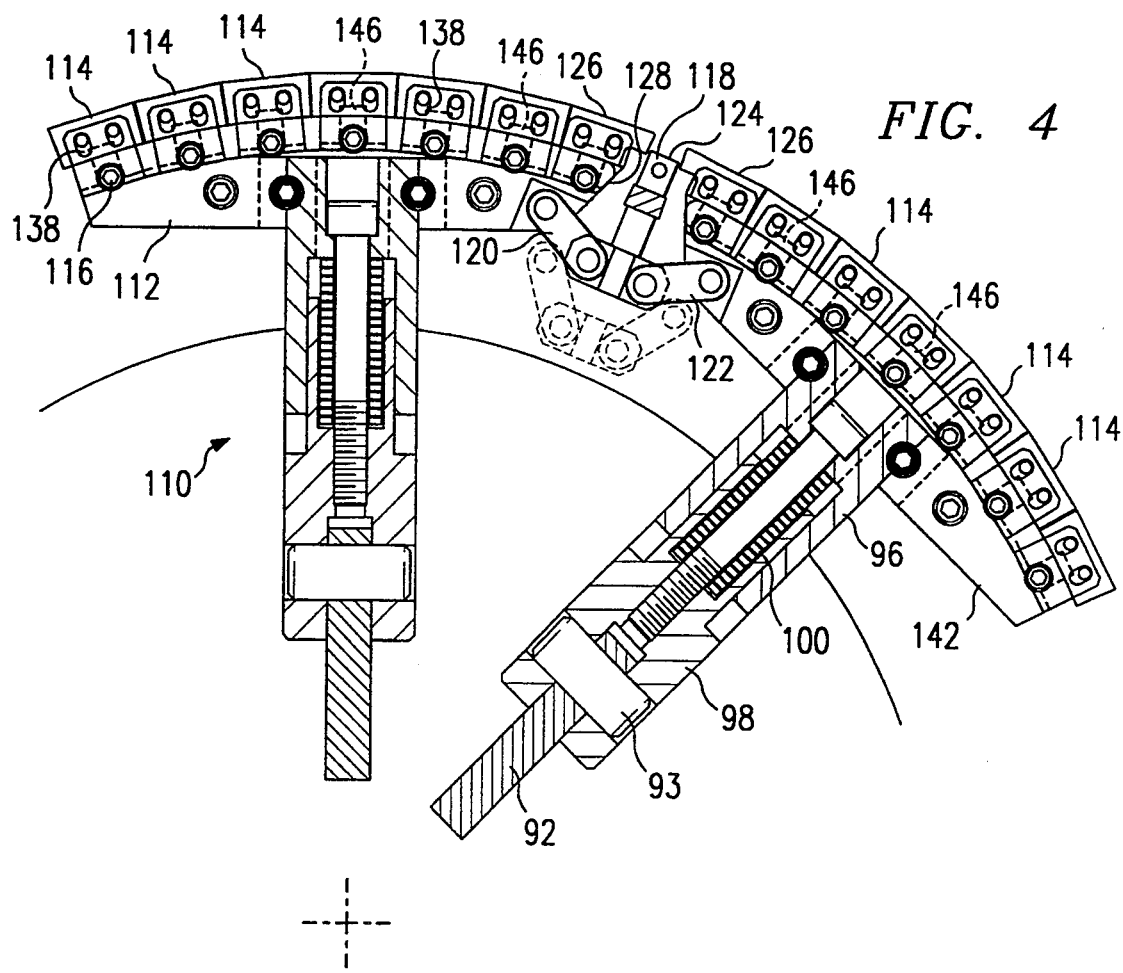
FIG. 4 is a cross sectional view of a modified back up ring.
Figure 5:
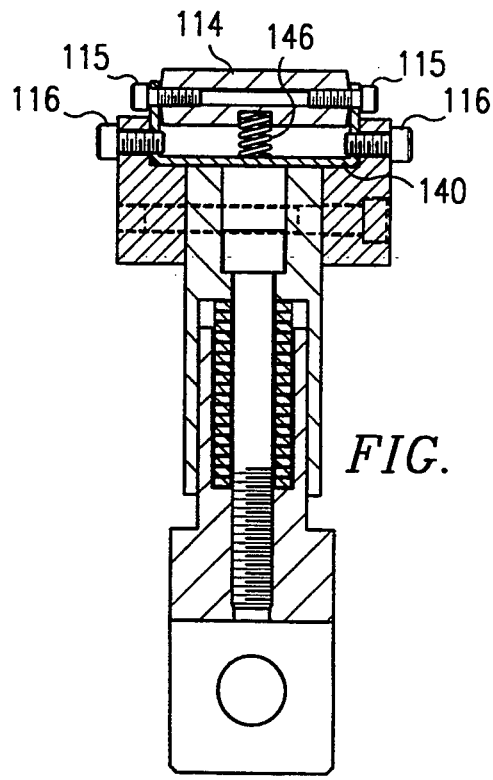
FIG. 5 is a side view of the back up ring of FIG. 4.

With reference now to FIGS. 4 and 5, a modified back up shoe clamp 110 is illustrated. A number of elements of clamp 110 are identical to clamp 88 and identified by the same reference numerals. However, the backup shoe 112 is made up of a series of individual shoe elements 114, preferably seven as shown in the figures. Each of the shoe elements 114 is individually bolted to the U-shaped plate 140 by four (4) bolts 115. The U-shaped plate 140 is fastened to shoe 112 by two bolts 116.

The bolts 115 each pass through an elongated slot 138 in a U-shaped plate 140 associated with each shoe element 114. The U-shaped plates 140 are, in turn, secured to the arcuate segment 142 by two bolts 116. A helical spring 146 is trapped between the arcuate segment 142 and each shoe element 114 to urge the elements 114 radially outward as far as permitted by the slots 138. Because the end of the pipes being welded is rarely a perfect circle, the shoe elements 114 will be able to tilt and deflect against the force of spring 146 to the extent permitted by slots 138 to conform to the inner surface of the pipes. Further, if an individual shoe element 114 is solidly welded to the weld, the retraction of the back up shoe will cause the failure of the relatively inexpensive U-shaped plate 140, allowing the clamp 10 to be removed and the welded shoe element 114 to be removed.

A fill block 118 is positioned between adjacent back up shoes 112 and is pivotally connected to each of the adjacent back up shoes by links 120 and 122. As can be seen in the figures, as the back up shoes move radially outward into contact with the inner surface of the pipes, the fill block 118 moves radially outward to a greater extent than the back up shoes so that the outer end 124 of the fill block is level with the outer surface 126 of the shoe elements 114 when engaging the inner surface of the pipes. When the back up shoes 112 are radially retracted toward the center line 24, the linkages force the fill block 118 to move radially inward more quickly past the edges 128 on each back up shoe so that the back up shoes can retract radially inward without interference.

Figure 8:
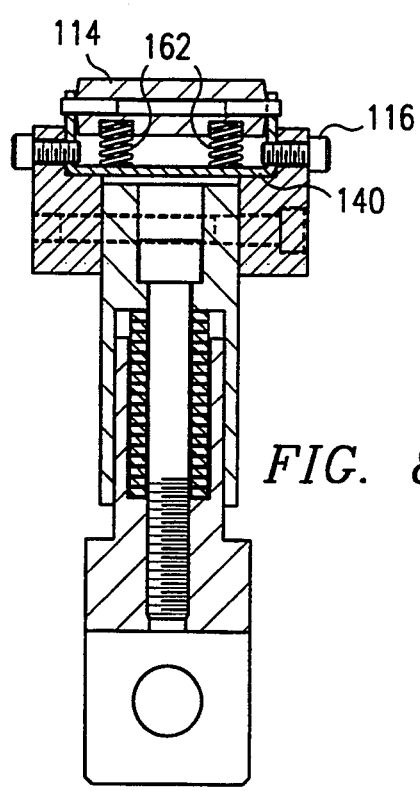
FIG. 8 is a detail view of a portion of the back up ring.
Figure 6:
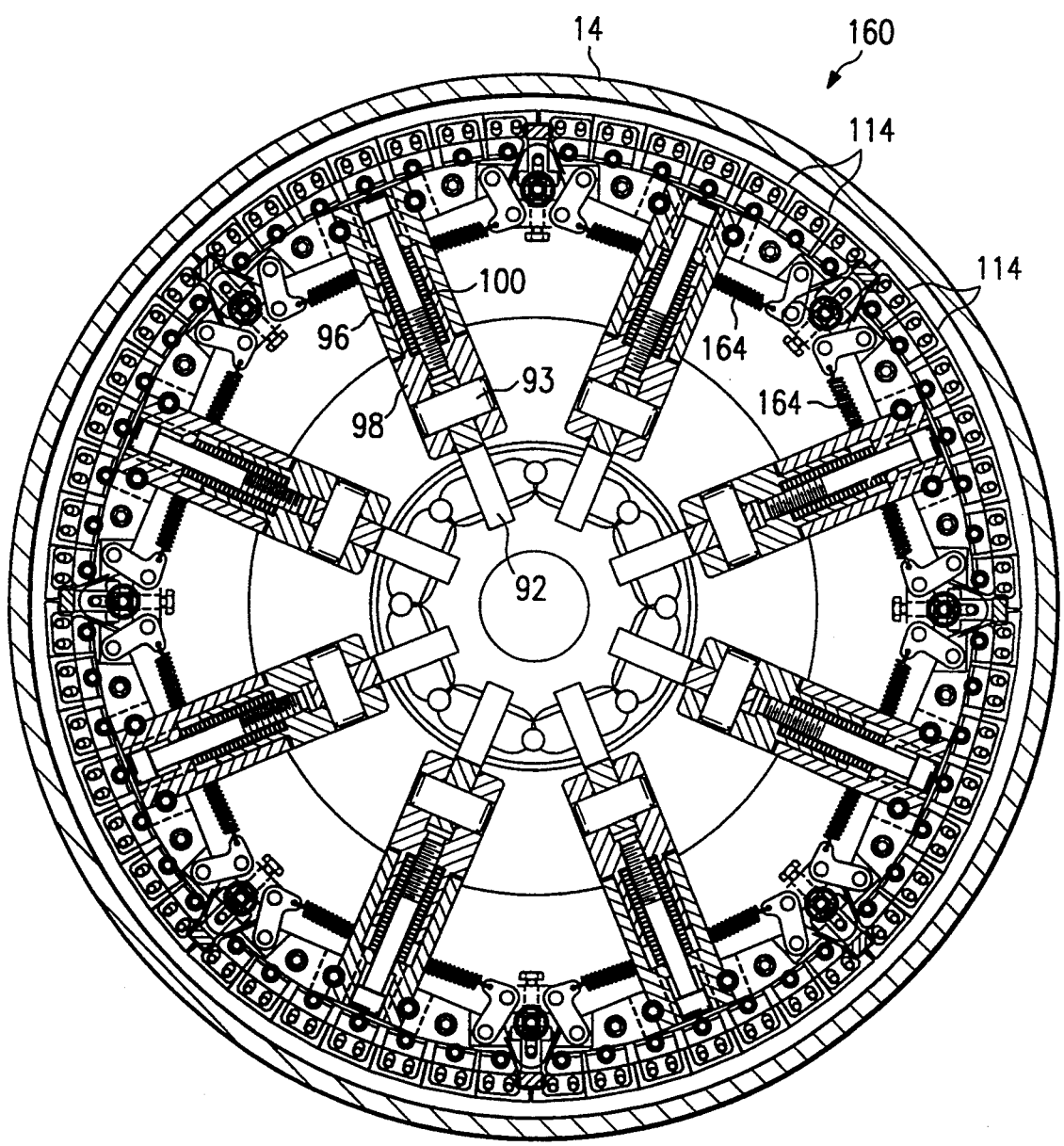
FIG. 6 is a cross sectional view of another modified back up ring in the released position.
Figure 7:
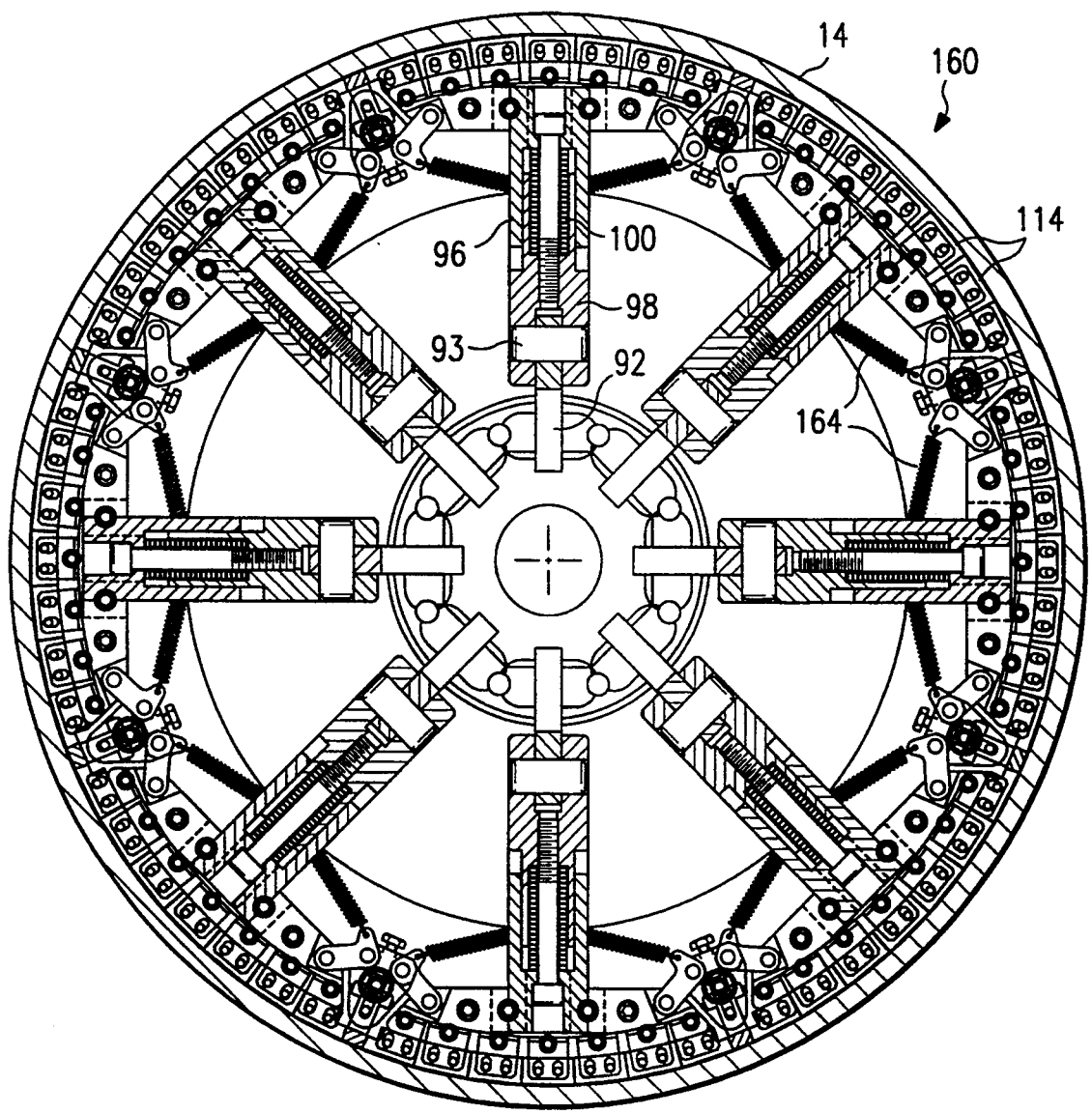
FIG. 7 is a cross sectional view of the back up ring of FIG. 6 with the back up ring engaging the inner surface of the pipes.

With reference to FIGS. 6-8, another modified back up shoe clamp 160 is illustrated. A number of the elements of clamp 160 are identical to clamp 88 and 110 and are identified by the same reference numeral. As best seen in FIG. 8, the shoe element 114 is urged radially outward by a pair of springs 162, as opposed to the single spring 146 used in clamp 110. The springs 162 are mounted side by side toward each end of the shoe element 114 extending along a direction parallel the longitudinal axis of the pipes. In one device constructed in accordance with the teachings of the present invention, each of the shoe elements 114 had a dimension along the axis of the pipes of about 1¾" and a dimension of about one inch along the circumference of the interior surface of the pipes against which the shoes are engaged.

As seen in FIGS. 6 and 7, assist springs 164 help insure retraction of the fill block 118 positioned between each of the back up shoes.

The internal pipe clamp 10 has a number of advantages over prior designs. The pistons 46 and 78 can be exposed to equal pressure in both the first and second chambers. Thus, if a number of the back up shoes are partially welded to the pipe in the welding process, the pistons are likely to provide sufficient retracting force to break the back up shoe free of the pipe. Further, as only air is utilized to expand and retract the various elements, there is no possibility of contamination of the weld site by hydraulic fluid. Further, the air pressure cylinders operate far more quickly than that possible by a hydraulically activated system.

Further, most pipe has a longitudinal seam which projects somewhat inward from the inner surface of the pipe. If a back up segment was a single piece intended to cover a 90° arc or more of the inner circumference of the pipe, the back up segment covering the longitudinal seam would be out of contact with the inner surface along its entire length, except at one end and at the seam. By using shorter segments as done in the present invention, the presence of the seam can only disturb a single segment. Also, since the ends of the pipe to be welded cannot be made perfectly circular even with clamps, the shorter segments have a better opportunity to come into intimate contact with the inner surface of the pipe. Further, the shoe elements 114 are essentially independent of pipe diameter and can be used with different size mounting brackets for use on different pipe diameters.

Although one embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the spirit and scope of the invention.

We claim:

1. An internal line up clamp and back up ring for clamping first and second pipes in proper orientation for welding and providing a back up ring at the weld comprising:
    a frame
    a first set of pipe clamps mounted on the frame for movement between a retracted position and a clamping position clamped against the interior surface of the first pipe;
    first structure mounted on the frame for moving the first set of pipe clamps to the clamping position;
    a second set of pipe clamps mounted on the frame for movement between a retracted position and a clamping position clamped against the interior surface of the second pipe;
    a back up ring mounted on the frame comprising a plurality of back up ring segments spaced from the second set of pipe clamps, each back up ring segment for movement between a retracted position and a back up position urged against the interior surface of the first and second pipes;
    second structure mounted on the frame for simultaneously moving the second set of pipe clamps and the back up ring into engagement with the pipes; and
    a fill block pivotally attached to adjacent back up ring segments to fill the gap between the back up ring segments as the back up ring segments are engaged with the interior surface of the pipes.

2. The internal line up clamp of claim 1 wherein said second structure for moving is double acting air cylinders.

3. The internal line up clamp of claim 1 wherein the back up ring segments include a back up ring shoe, a back up ring base and a spring interconnecting the back up ring shoe and the back up ring base, the back up ring shoe contacting the interior surface of the pipes.

4. The internal line up clamp of claim 3 wherein the back up ring shoes have a length of about six inches.

5. The internal line up clamp of claim 3 wherein the length of the back up ring shoe is about one inch.

6. An internal line up clamp and back up ring for clamping first and second pipes in proper orientation for welding and providing a back up ring at the weld, comprising;
    a frame;
    a first set of pipe clamps mounted on the frame for movement between a retracted position and a clamping position clamped against the interior surface of the first pipe;
    first structure mounted on the frame for moving the first set to the clamping position;
    a second set of pipe clamps mounted on the frame for movement between a retracted position and a clamping position clamped against the interior surface of the second pipe;
    a back up ring mounted directly on the frame comprising a plurality of back up ring segments spaced from the second set of pipe clamps and guided by the frame, each back up ring segment for movement between a retracted position and a back up position urged against the interior surface of the first and second pipes;
    second structure mounted on the frame for simultaneously moving the second set of pipe clamps and back up ring into engagement with the pipes; and
    a fill block pivotally attached to adjacent back up ring segments to fill the gap between the back up ring segments as the back up ring segments are engaged with the interior surface of the pipes.

7. The internal line up clamp of claim 6 wherein said second structure for moving is double acting air cylinders.

8. The internal line up clamp of claim 6 wherein the back up ring segments include a back up ring shoe, a back up ring base and a spring interconnecting the back up ring shoe and the back up ring base, the back up ring shoe contacting the interior surface of the pipes.

9. The internal line up clamp of claim 8 wherein the back up ring shoes have a length of about six inches.

10. The internal line up clamp of claim 8 wherein the length of the back up ring shoe is about one inch.

11. The method of installing an internal line up clamp having a frame and back up ring in a first and second pipe to clamp the pipes in alignment for welding and provide a back up ring at the weld comprising the steps of;

positioning the frame within the interior of the first and second pipes at adjacent ends of the pipes;

extending a first set of pipe clamps mounted on the frame against the interior surface of the first pipe to clamp the internal line up clamp to the first pipe;

simultaneously extending a second set of pipe clamps into engagement with the interior surface of the second pipe and extending a plurality of back ring segments into engagement with the interior surface of the pipes at the weld, the back ring segments being spaced from the second set of pipe clamps; and filling the gap formed between adjacent back up shoes moved into engagement with the interior surface of the pipes with a fill block pivotally secured to the adjacent back up ring segments.

* * * * *

UNITED STATES PATENT AND TRADEMARK OFFICE
CERTIFICATE OF CORRECTION

PATENT NO. : 5,356,067

DATED : October 18, 1994

INVENTOR(S) : Leduc

It is certified that error appears in the above-indentified patent and that said Letters Patent is hereby corrected as shown below:

Column 2, Detailed Description, line 62, delete the degree symbol (°) and insert a period (.).

Signed and Sealed this

Twenty-seventh Day of June, 1995

Attest:

BRUCE LEHMAN

*Attesting Officer*     *Commissioner of Patents and Trademarks*